United States Patent Office 2,826,464
Patented Mar. 11, 1958

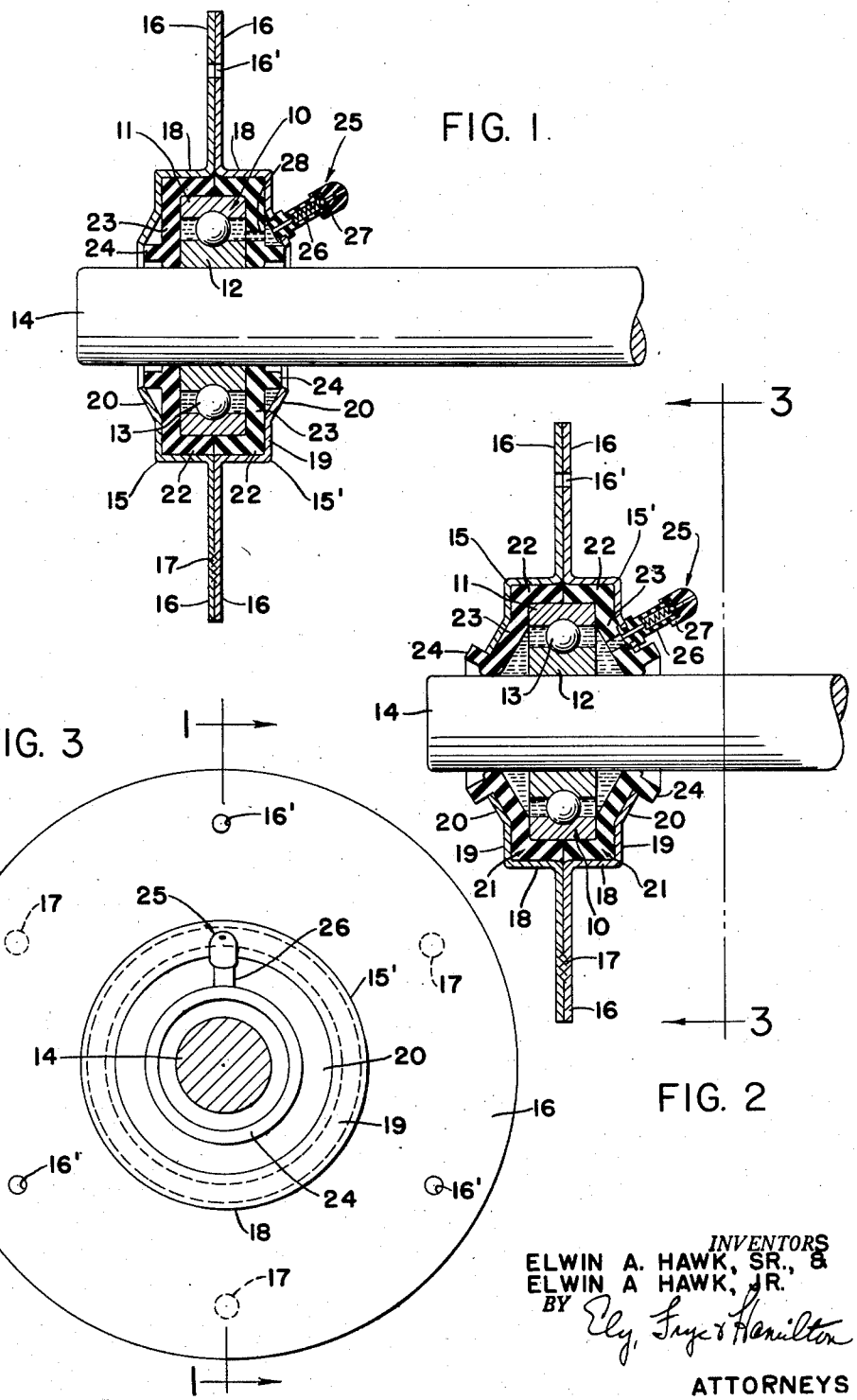

2,826,464

SHOCK PROOF ANTI-FRICTION BEARING

Elwin A. Hawk, Sr., and Elwin A. Hawk, Jr.,
East Rochester, Ohio

Application May 15, 1956, Serial No. 585,105

7 Claims. (Cl. 308—184)

The invention relates generally to anti-friction bearing units adapted for a variety of uses, and more particularly to an improved inexpensive anti-friction bearing unit which will withstand shock loads.

Conventional anti-friction bearing units are usually constructed to have cast metal housings which are relatively expensive and do not satisfactorily stand up under shock loads as they cause shattering or breakage of the anti-friction elements. It has been attempted to make such bearings shock proof by incorporating cushioning members between the housing and the bearing elements, but this has not proven satisfactory because mis-alignment of the bearing usually results, and further, the difficulty of maintaining a seal for the bearing lubricant may be increased.

It is an important object of the present invention to provide an improved shock proof anti-friction bearing unit having a pressed steel housing which is adapted for quick and easy mounting in operating position on substantially any type of support.

Another object is to provide an improved anti-friction bearing unit which is self-aligning and which utilizes the self-aligning action to feed lubricant through the bearing and its seals.

A further object is to embody the foregoing advantageous features in a simple and inexpensive construction which is extremely economical to manufacture, easy to assembly and dis-assemble, and which requires a minimum of maintenance.

These purposes, and others which will appear from the following description, are accomplished by surrounding the anti-friction bearing in an oil resistant, resilient cushioning layer which is pre-loaded to a predetermined extent by compressing the cushioning layer within a pressed steel housing enclosing the bearing unit, portions of said cushioning layer being arranged for flexing movement within the housing to compensate for varying amounts of lubricant within said cushioning layer.

A preferred form of the invention is shown by way of example in the accompanying drawing, and described in detail herein. Various modifications and changes in details of construction are intended within the scope of the appended claims.

In the drawings:

Fig. 1 is a cross section of a bearing unit constructed according to the invention and mounted on a shaft, showing the lubricant within the unit partially depleted, taken along line 1—1 of Fig. 3.

Fig. 2 is a similar view showing the bearing unit full of lubricant and the legs of the cushioning layer flexed outwardly.

Fig. 3 is a transverse section on line 3—3 of Fig. 2 showing the improved bearing unit in end elevation.

The bearing shown at 10 in the drawings is a conventional ball bearing having an outer race 11, an inner race 12 with a series of balls 13 mounted between the races. The inner race is secured on the shaft 14 in a suitable manner, as by a press fit.

The outer housing is preferably made in two mating parts or halves 15 and 15' having annular flanges 16 adapted to be secured together in abutting relation. As shown, the flanges 16 may be spot welded together at spaced locations indicated at 17, and at other spaced locations mating holes 16' are provided in the flanges for receiving bolts attaching the housing to a suitable support. Other known methods of attaching the flanges 16 together and to a suitable support may be employed within the scope of the invention.

The annular flanges 16 of the housing parts 15 and 15' preferably have outturned cylindrical walls 18 at their inner edges, and annular flange or web portions 19 extend radially inward from the outer edges of the walls 18. The portions 19 have radially inner conical portions 20 which are inclined away from each other axially of the shaft 14, for a purpose to be described. The inner edges of conical portions 20 terminate in spaced relation to said shaft.

The resilient cushioning layer is preferably formed in two cup-shaped parts 21 which surround the bearing 10 within the housing, and have outer cylindrical wall portions 22 which abut each other preferably at the parting line between the annular flanges 16. The parts 21 are preferably formed of oil and grease resistant rubber or other elastomeric material. The outer edges of the wall portions 22 have web portions or walls 23 normally extending radially inward and yieldingly abutting the shaft at their inner edges. The cups 21 are made oversize with respect to the space between the bearing 10 and the housing, and the dimensions are so calculated that when the housing parts are pressed together the rubber will be compressed and pre-loaded to a predetermined extent. The amount of preloading may be of the order of 25% of the rated radial load capacity of the bearing 10.

Obviously, the amount or mass of rubber in the cushioning layer may be varied, but it is preferred to use a mass of rubber varying from one-third of the mass of the metal in the bearing and housing to a mass equal to that of the metal.

When the rubber layer 21, 21 is compressed or pre-loaded within the housing, such pre-loading will normally cause the webs 23 to assume the radial positions of Fig. 1, with the inner edges of the webs resiliently abutting the shaft and forming a seal therewith. As shown the webs 23 are preferably provided adjacent their inner edges with annular ribs 24 extending axially outward, and these ribs are adapted to fit within the inner edges of the conical housing portions 20 when the webs are in the radial positions of Fig. 1. The ribs 24 function to indicate the amount of lubricant within the bearing, in a manner to be described.

A lubricant fitting 25 is mounted on one of the conical portions 20 for injecting lubricant into the bearing within the resilient cushioning layer. This fitting 25 may be of conventional construction having a rubber stem portion 26 with a spring-pressed inner valve 27, and the fitting communicates with the interior of the bearing through a hole 28 in one of the resilient webs 23.

Now, with the resilient cups 21 in the positions of Fig. 1, as lubricant is injected under pressure through the fitting 25, the internal pressure will force the webs 23 to flex away from each other and against the conical portions 20 of the housing to the positions shown in Fig. 2, the ribs 24 sliding past the inner edges of housing portions 20 and projecting outwardly therefrom. In this position of the webs 23, their inner edges still resiliently abut the shaft due to the pre-loading of the cups.

If the shaft and bearing housing are mis-aligned, such mis-alignment will be compensated for by the resilience of the cups 21, so that the bearing unit becomes self-aligning. Moreover, as the bearing is operated, lubricant will gradually seep out under the edges of the webs, thus constantly maintaining lubricant seals against the entrance of foreign matter at those locations. Any mis-alignment of the bearing contributes to the working or flexing of the cushioning members, enhancing constant circulation of the lubricant within the bearing and avoiding a static condition thereof.

As the lubricant within the bearing is gradually depleted over long periods of use, this condition is indicated by the position of the ribs 24 relative to the conical housing portions 20, which act as a visual reminder to inject a fresh supply of lubricant when needed.

The improved bearing construction absorbs shock loads while providing its own lubricant seal and constantly circulates lubricant within the bearing. The unit is simple and economical to manufacture, quickly and easily mounted on various types of supports. The improved pressed steel housing greatly increases the strength to weight ratio, as compared with a conventional bearing having a cast housing.

What is claimed is:

1. A shock proof bearing unit having an anti-friction bearing for journaling a rotating element, said unit including a resilient cushioning layer surrounding said bearing and having normally radial walls for yieldingly abutting said rotating element at their radially inner edges, and a two-part sheet metal housing containing a portion of said cushioning layer under compression, said housing having wall portions axially spaced from the radial walls of said cushioning layer to permit axial flexing of the radial walls under internal pressure within said cushioning layer.

2. A shock proof bearing unit having an anti-friction bearing for journaling a rotating element, said unit including a resilient cushioning layer surrounding said bearing and having normally radial walls for yieldingly abutting said rotating element at their radially inner edges, and a two-part sheet metal housing containing a portion of said cushioning layer under compression, said housing having conical wall portions inclined outwardly from the radial walls of said cushioning layer to permit axial outward flexing of said radial walls.

3. A shock proof bearing unit having an anti-friction bearing for journaling a rotating element, said unit including resilient cups having outer abutting walls and radial walls for yieldingly abutting said rotating element at their radially inner edges, and a two-part sheet metal housing clamping said outer abutting walls together under compression, said housing having flange portions normally axially spaced from said radial walls to permit axial flexing thereof.

4. A shock proof bearing unit having an anti-friction bearing for journaling a rotating element, said unit including resilient cups having outer abutting walls and radial walls for yieldingly abutting said rotating element at their radially inner edges, and a two-part sheet metal housing clamping said outer abutting walls together under compression, said housing having conical flange portions inclined outwardly from the radial walls to permit axial flexing thereof.

5. A shock proof bearing unit having an anti-friction bearing for journaling a rotating element, said unit comprising a sheet metal housing having two mating parts secured together in abutment around said bearing in spaced relation thereto, said mating parts having wall portions inclined away from each other for engirdling said rotating element, and a resilient cushioning layer of elastomeric material surrounding said bearing within said housing, said layer having a portion held under compression by said housing and walls for yieldingly abutting said rotating element adapted to flex axially within said inclined housing wall portions.

6. A shock proof bearing unit having an anti-friction bearing for journaling a rotating element, said unit comprising a sheet metal housing having two mating parts secured together in abutment around said bearing in spaced relation thereto, and resilient cups of elastomeric cushioning material surrounding said bearing within said housing, said cups having outer abutting walls held under compression by said housing and radial walls for yieldingly abutting said rotating element at their radially inner edges, said housing having flange portions normally axially spaced from said radial walls to permit axial flexing of said radial walls under internal pressure.

7. A shock proof bearing unit having an anti-friction bearing for journaling a rotating element, said unit comprising a sheet metal housing having two mating cup-shaped parts with outer annular flanges secured together in abutment, said housing surrounding said bearing in spaced relation thereto, and resilient cups of elastomeric cushioning material surrounding said bearing within said housing, said cups having outer end-to-end abutting walls held under compression by said housing and radial walls for yieldingly abutting said rotating element at their radially inner edges, and said housing having conical flange portions inclined away from each other to permit axial flexing of said radial walls under internal pressure.

References Cited in the file of this patent

UNITED STATES PATENTS

| | | |
|---|---|---|
| 2,173,250 | Fay | Sept. 19, 1939 |
| 2,653,063 | Arndt et al. | Sept. 22, 1953 |